UNITED STATES PATENT OFFICE.

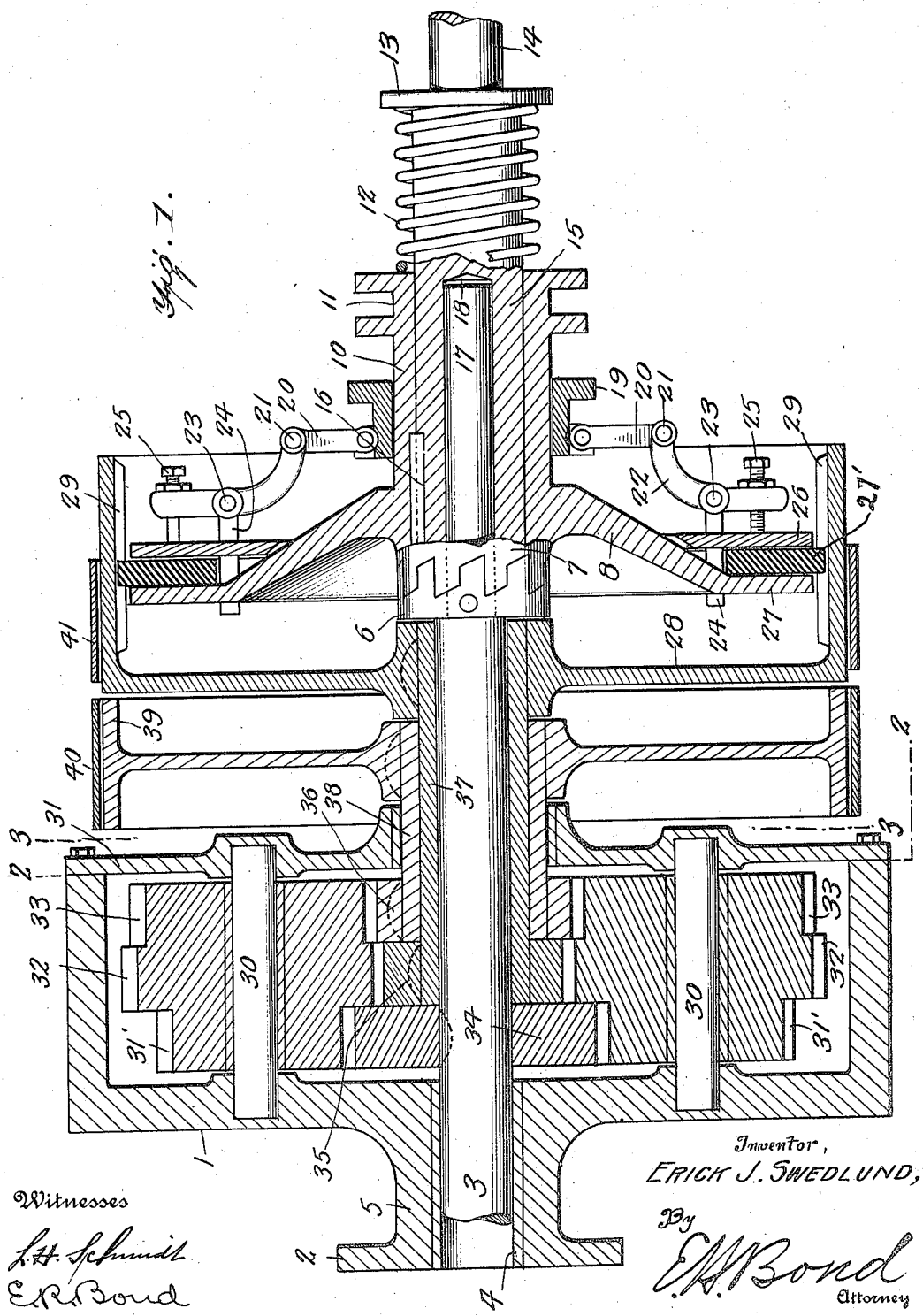

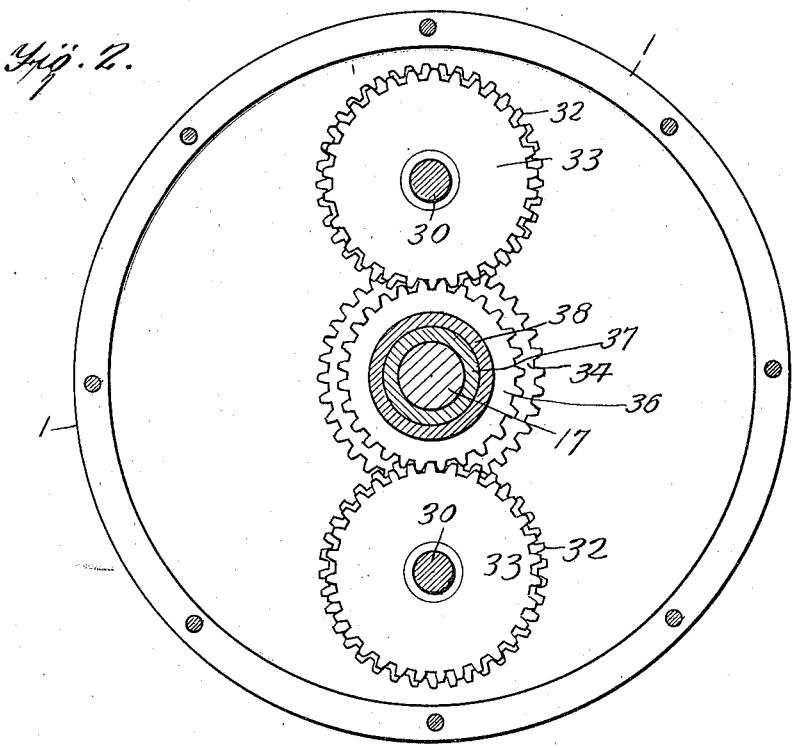
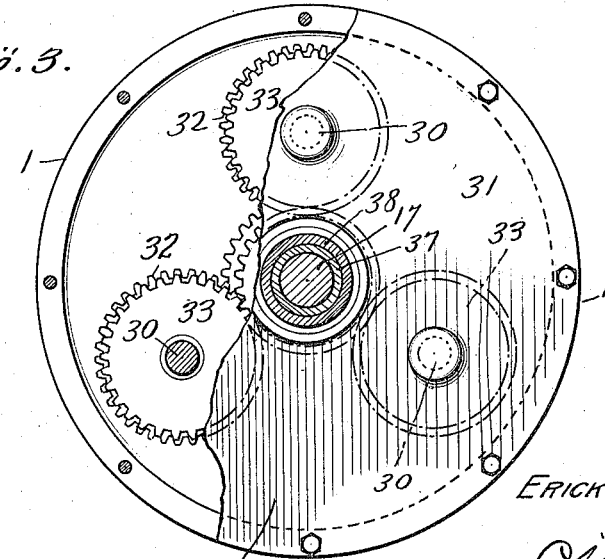

ERICK J. SWEDLUND, OF WILLISTON, NORTH DAKOTA.

TRANSMISSION-GEARING.

1,045,213.  Specification of Letters Patent.  Patented Nov. 26, 1912.

Application filed June 23, 1911. Serial No. 635,008.

*To all whom it may concern:*

Be it known that I, ERICK J. SWEDLUND, a citizen of the United States of America, and resident of Williston, in the county of Williams and State of North Dakota, have invented certain new and useful Improvements in Transmission-Gearing, of which the following is a specification.

This invention relates to certain new and useful improvements in variable speed gearing of that class known as transmission gearing designed more especially for motor vehicles or the like in which is employed a planetary arrangement of gearing.

The present invention has for its objects among others to provide a device of this general nature, simple in its construction, reliable and efficient in operation and in which I provide one additional speed and a neutral position so that the driving member may rotate at motor speed without any idle-gearing in motion. I so arrange the driving member or gear casing that it shall always rotate at motor speed and may be utilized as a fly wheel on the motor, thus greatly reducing the weight. By my improved construction also the friction loss is reduced to a minimum.

I aim further at improvements in details of construction whereby the device as a whole is rendered exceedingly simple and the cost of manufacture reduced to a minimum.

Other objects and advantages of the invention will hereinafter appear and the novel features thereof will be particularly pointed out in the appended claims.

The invention is clearly illustrated in the accompanying drawings, which, with the numerals of reference marked thereon, form a part of this specification, and in which—

Figure 1 is a vertical longitudinal section through my improved transmission-gearing with a portion broken away and parts shown in elevation. Fig. 2 is a cross section on the line 2—2 of Fig. 1 Fig. 3 is a cross section, on a reduced scale, on the line 3—3 of Fig. 1, with portions broken away Like numerals of reference indicate like parts throughout the different views.

Referring to the drawings, 1 designates the gear case which is designed to be coupled directly to the motor shaft by the collar 2 in any suitable manner. This gear case rotates at all times with the motor and is the driving member of the mechanism.

3 is the intermediate driven shaft mounted within a bushing 4 in the member 5 which carries the collar 2, as seen best in Fig. 1. On this shaft 3 is keyed or otherwise affixed a clutch jaw 6, while the other member 7 is herein shown as an extension of the clutch member 9 which has a hub or sleeve 10 upon the end of which is the shifting collar 11.

12 is a spring bearing at one end against a collar or the like 13 on the driven shaft 14 and at its other end bearing against the outer face of the shifting collar 11, as seen clearly in Fig. 1. This shaft 14 has a portion 15 on which the hub 10 of the clutch 8 is mounted to slide but not to rotate, any suitable means, such as a key or the like 16, being provided for this purpose. The intermediate shaft 3 has a reduced extension 17 received within the bore 18 of the portion 15 of the driven shaft 14, as will be clearly understood upon reference to Fig. 1.

19 is a shifting collar mounted to slide upon the hub 10, as clearly illustrated in Fig. 1, and pivotally connected with this collar are the links 20 which, in turn, are connected at one end, as at 21, with the curved arms 22 pivotally mounted, as at 23, upon a suitable support 24, the ends of the arms beyond the pivots being provided with set screws or the like 25, by which proper adjustment may be had when desired. These screws bear against the plate 26 between which and the parallel portion 27 of the clutch member 8 is disposed the clutch ring 27' which is mounted inside of a drum 28 and designed to rotate with it but adapted to slide back and forth with the clutch member, the outer periphery of the ring being constructed to engage on the keyways 29 on the inner face of said drum, as seen clearly in Fig. 1.

30 is a shaft mounted in the gear case 1, being mounted at one end in a suitable bearing in the detachable head 31 of said case, as seen in Fig. 1. On the shaft 30 within the gear casing are mounted the planetary spur gears 31', 32 and 33 of different diameters, as will be clearly seen upon reference to Fig. 1. It is evident that two or three sets of these planetary gears may be arranged within the gear case, upon similar shafts 30, and arranged at equal distances apart. These planetary gears intermesh with the sun gears 34, 35 and 36 respectively. The gear 34 is rigidly mounted on or keyed upon the shaft 3, while the gear 35 is keyed to a sleeve 37 surrounding the shaft 3 and the gear 36 is keyed to a sleeve 38 surrounding the sleeve 37. On the outer end of the sleeve 37 is mounted the brake drum 28, while on the outer end of the sleeve 38 is mounted the brake drum 39. 40 is a brake band for coöperation with the brake drum 39 while 41 is a brake band for coöperation with the brake drum 28.

With the parts constructed and arranged substantially as hereinbefore described, the operation will be evident from the foregoing description, when taken in connection with the annexed drawings. Briefly stated, it is as follows: When the clutch members 6 and 7 are interengaged, as seen in Fig. 1, the shafts 3 and 14 rotate together as one, but when the clutch members are disengaged, these two shafts rotate independently of each other. When using the three forward speeds, the clutch members 6 and 7 are always engaged but are disengaged for reverse and neutral speed. The gear case 1 with the planetary gears therein constitutes a driving member which always rotates with the motor. The reverse motion is transmitted to the driven shaft 14 through the gear wheel 35 and the sleeve 37 to the drum 28 and thence by means of the clutch to the shaft 14, the jaw clutches 6 and 7 being disengaged and the gear wheel 36 held stationary by the brake band 40. With the parts in the position in which they are shown in Fig. 1, with the friction clutch 26—27—27' engaged and the gears locked, all parts revolve together as a whole at motor speed. To engage the intermediate gear, the shifting collar 19 is moved, thus disconnecting the clutch from the brake drum 28 and the brake band 41 is applied to the drum. To make still another change, the brake band 41 is released from the drum 28 and the brake band 40 applied to the brake drum 39. The clutch member is then moved outward by means of the shifting collar 11 against the tension of the spring 12, so as to disengage the clutch members 6 and 7 and the clutch 26—27—27' engaged by the shifting collar 19. When a neutral position is desired, it is attained by the disengagement of the clutch members 6 and 7, the clutch member 8 and the brake bands 40 and 41, when the driving member with the gear sleeves and drums will revolve but will transmit no motion to the driven shaft, and no gears will be in motion.

The gear ratios can be changed to suit the varying circumstances under which it may be desired to use the device but I have found that satisfactory results are obtained by substantially the following ratios, namely intermediate 2 to 1; low 3¼ to 1, and reverse 4 to 1.

The particular construction of clutch herein shown may be replaced by other forms capable of performing the same functions.

From the foregoing, it will be seen that I have devised a simple and efficient form of transmission gear and while the structural embodiment of the invention as hereinbefore disclosed is what I consider at the present time as preferable, it is evident that the same is subject to changes, variations and modifications in detail without departing from the spirit of the invention or sacrificing any of its advantages. I, therefore, do not wish to restrict myself to the details, proportions of parts, etc., hereinbefore explained but reserve the right to make such changes, variations and modifications as come properly within the scope of the protection prayed.

Especial importance is attached to the fact that I provide one additional speed and a neutral position whereby the driving member may rotate as a whole at motor speed without any idle gears in motion and by reason of the fact that the gear casing containing said gears is always rotated at motor speed, it may be utilized as a fly wheel on the motor, by making it of suitable weight for that purpose, thus saving the weight of the transmission gear in a motor car as this weight will be taken up by the fly wheel.

In my construction the high speed is direct; on the intermediate speed, it has only one idle gear in motion and that is very slow as the wheel 36 has but about one revolution to eight of the driving member.

What is claimed as new is:—

1. In a transmission gearing, a gear case constituting a fly wheel and mounted to rotate at all times at motor speed, a driven shaft, an intermediate shaft, a positive clutch mechanism for connecting the two shafts, a friction clutch member carried by one of the members of the positive clutch mechanism, a friction clutch member coöperating therewith, planetary gears mounted within said casing, and sun gears meshing therewith, one of which is rigidly mounted on said intermediate shaft, the others being loosely mounted upon said shaft.

2. In a transmission gearing, a gear case constituting a fly wheel and mounted to rotate at all times at motor speed, a driven shaft, an intermediate shaft, positive clutch mechanism between the two shafts, a friction clutch member carried by one of the members of the positive clutch mechanism, a friction clutch member coöperating therewith, planetary gears mounted within said casing, sun gears one of which is fixedly secured to said intermediate shaft and the others loose thereon, a brake drum for each of the loosely mounted sun gears, and a movable clutch member for engagement with one of said brake drums.

3. In a transmission gearing, a gear case, a driven shaft, an intermediate shaft, a positive clutch for connecting said shafts, a friction clutch member carried by one of the members of the positive clutch, a series of planetary and sun gears in said case, and means coöperating with said friction clutch member and for controlling the action of said gears.

4. In a transmission gearing, a motor shaft, a driven shaft, a shaft intermediate the two, planetary gears, sun gears one of which is fast upon said intermediate shaft and the others loosely mounted thereon, a positive clutch mechanism between the intermediate and driven shafts, and a friction clutch mechanism intermediate the driven shaft and one of the loosely mounted sun gears.

5. In a transmission gearing, a driving shaft rotatable at motor speed, planetary gears carried thereby, a driven shaft rotatable at variable speeds, an intermediate shaft, loosely mounted sun gears on said intermediate shaft, a positive clutch mechanism interposed between the driven and intermediate shafts, and a yielding clutch member and a coöperating clutch member coöperating with one of the loosely mounted sun gears, said clutch mechanisms being operable independently of each other.

6. In a transmission gearing, a driving shaft rotatable at motor speed, a plurality of planetary gears movable with said driving member, a driven member, an intermediate shaft, a plurality of sun gears mounted on the latter, a positive clutch for connecting the driven and intermediate shafts, said sun gears intermeshing with the planetary gears and one of said sun gears being rigidly mounted on the intermediate shaft, the other sun gears being loosely mounted on said shaft, a brake drum connected with each loosely mounted gear, means for holding said brake drums from rotation, and a movable means carried by one of the members of the positive clutch for clutching one of the loosely mounted sun gears to the intermediate shaft.

Signed by me at Williston N. D. this 19 day of June 1911.

ERICK J. SWEDLUND.

Witnesses:
S. M. HYDLE,
S. R. OTESA.